March 3, 1936.　　　　F. L. DARLING　　　　2,032,920
GLASS CONTAINER AND METHOD OF PRODUCING SAME
Filed Dec. 19, 1932　　　2 Sheets-Sheet 1

Inventor
Frank L. Darling.

Attorneys

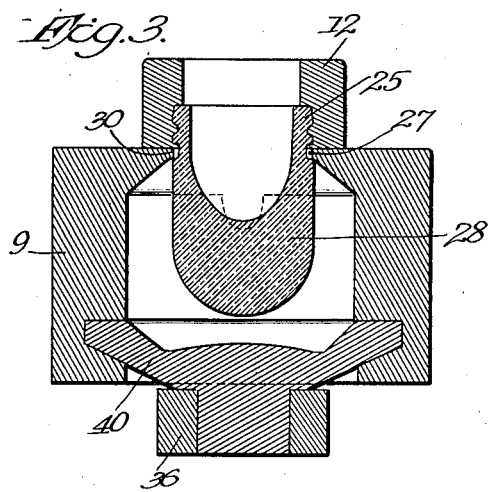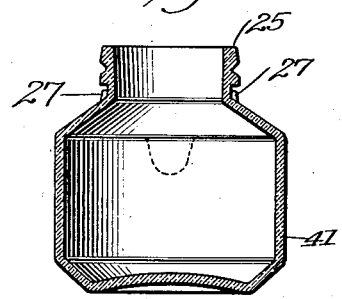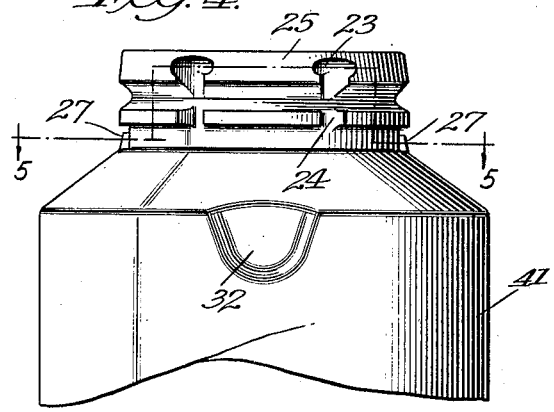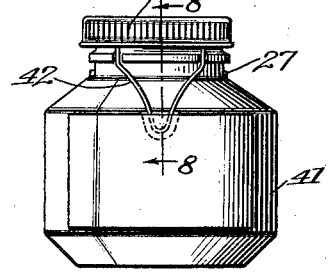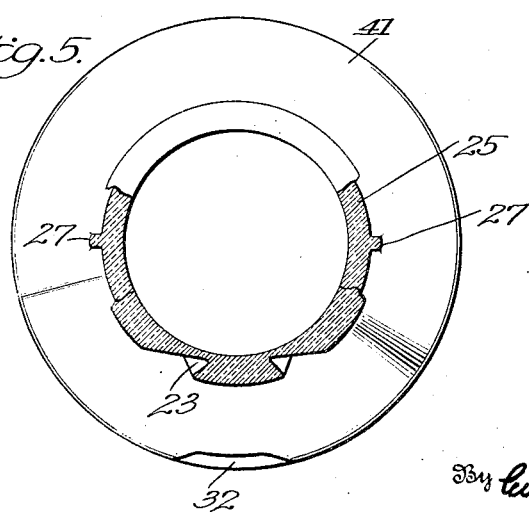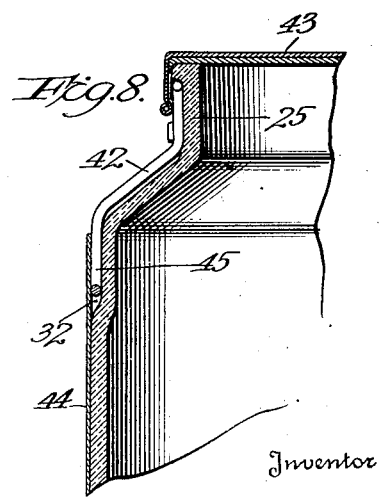

Patented Mar. 3, 1936

2,032,920

UNITED STATES PATENT OFFICE 2,032,920

GLASS CONTAINER AND METHOD OF PRODUCING SAME

Frank L. Darling, Baltimore, Md., assignor to Anchor Cap & Closure Corporation, Long Island City, N. Y., a corporation of New York Application December 19, 1932, Serial No. 648,014

21 Claims. (Cl. 49—9)

The present invention relates to a new and improved method and apparatus for forming glass containers such as bottles, jars and the like, and more especially to improved means for insuring a predetermined positional relationship between a predetermined portion of the body of the container and a predetermined portion of the neck during the formation of the container by a forming machine.

In the making of glass bottles, jars and the like which are molded with a neck and body, it has been customary to first form the neck in a neck ring mold while holding the body blank in the blank mold of a forming machine, and then transferring the formed neck and body blank, to a blow mold where the body is formed into the desired shape and size. In the making of containers of this type, it has not been necessary heretofore to provide means for insuring a predetermined positional relationship between parts of the neck with parts of the body.

An important object of the present invention consists in a new and improved method of forming glass containers of the type having a neck and body such as bottles, jars and the like, in which the neck is first formed with the body blank attached thereto and the body blank provided with means that coact with complementary means on the blow mold for insuring a predetermined positional relationship between a predetermined portion of the neck and a predetermined portion of the body during the blowing operation.

A further object consists in providing positive means on the body blank of the container arranged to coact or engage with complementary means on the blow mold for insuring the formation of a depression in the body of the container during the blowing operation, which depression is positioned in a predetermined relationship to a predetermined portion of the neck, so as to prevent the possibility of these parts being distorted or moved out of alignment after the transfer operation of the container from the blank mold to the blow mold. More particularly, positive means are provided for insuring the depression in the body being formed at a point below and medially of the cap removing recesses in the neck, so that the cap remover which movably fits within the recesses will at all times be properly positioned to have its handle portion extend within the depression in the container.

Other and further objects of the invention will be obvious upon an understanding of the illustrative embodiment about to be described, or will be indicated in the appended claims, and various advantages not referred to herein will occur to one skilled in the art upon employment of the invention in practice.

Referring to the drawings, in which is shown a preferred embodiment of the invention:

Figure 3 is a sectional view taken substantially along the line 3—3 of Figure 1.

Figure 4 is a front view of the upper portion of a bottle, jar or the like formed in accordance with my invention.

Figure 5 is a sectional view taken substantially along the line 5—5 of Figure 4.

Figure 6 is a cross section of a bottle, jar or the like showing the lugs or projections at the juncture of the body and neck.

Figure 7 is a front view of a jar formed in accordance with the present invention, and Figure 8 is an enlarged sectional view taken along the line 8—8 of Figure 7.

Figures 1, 2:
Figure 1 is a sectional view of a glassware forming machine with my invention applied thereto.
Figure 2 is a plan view of Figure 1 showing the sections of the blank mold and neck ring in their open position and the blow mold closed.

For the purpose of showing the method and means which may be employed for making a glass container in accordance with my invention, there is disclosed in Figures 1 and 2 a glassware forming machine of well known and standard construction with the parts in the transfer position.

As shown, the machine comprises the blank mold table 10 and the blow mold table 11, each of which is revolubly mounted so as to be actuated at predetermined intervals during the operation of the machine, in order to bring the blank successively to the several operating positions or stations and transfer the formed neck and body blank to the blow mold to form the body. The holders 12 of the neck ring molds 7 and the holders 13 of the blank molds 8 are movably connected to a bolt 14 carried by a revoluble member 14' mounted on the table 10 in any suitable manner, not shown, so that these holders will be opened and closed at predetermined points in the path of travel of the table 10. Each of the neck ring holders 12 is connected by a link 15 to a cross strap 16 that has a medially disposed upwardly extending reduced flange 17 which fits between the spaced flanges of the yoke member 18 (Figure 1). The yoke member 18 in turn is connected to the piston shaft 19 so that upon axial movement of the yoke 18, the neck ring holders 12 will be moved to either their closed or opened position. The blank mold holders 13 are each provided with lugs 20 that are connected to a link or plunger 21 so as to be actuated by suitable means, not shown, for causing them to assume their opened or closed position. The revoluble member 14' during each revolution of the blank mold table 10 rotates one-half turn, by any suitable means, in order to insert the blank molds at the proper time for charging and blowing the blank. The operation of the machine is such that the neck rings 7 and blank molds 8, during the movement of the revoluble member 14', are carried to their closed positions by the axial movement of the piston rod 19 and plunger 21 outwardly or towards the blow mold table 11.

The neck ring molds 7 are provided with the projections 22 shaped to form the laterally disposed openings or recesses 23 and the vertical grooves 24 in the outer surface of the neck (Figure 4). Additionally, the blank molds 8 have diametrically opposed notches or recesses 26 which form the lugs or protuberances 27 in the body blank or parison 28 when the neck ring is being shaped. These lugs 27 are preferably positioned at the juncture of the neck and body so that when the blank 28 with the formed neck 25 is transferred to the blow mold 9 carried by the holders 29, the lugs 27 will fit or engage in complementary notches or recesses 30 formed in the blow mold, so as to prevent rotational movement or distortion of the container when the neck ring mold releases the blank and while the blank is carried by the blow mold to insure a predetermined positional relationship between a predetermined portion of the neck and a predetermined portion of the blow mold. The blow mold 9 has a projection 31 for forming a depression or recess 32 in the outer wall or face of the body. It will be seen that due to the engagement or registration of the lugs 27 with the recesses 30 when the blow mold is in its closed position, that positive means are provided for causing the depression 32 being formed at a point below and medially of the cap removing recesses 23 in the neck, so that these parts will at all times be in a predetermined fixed position relative to each other.

If the depression 32 is not accurately centered with respect to the grooves 24 and recesses 23, the opener 42 will not fit properly on the bottle. When the neck ring molds release the blank, the glass frequently adheres more to one half of the neck ring than to the other. Hence, when the neck ring mold is opened, there is a tendency to rotate the blank with respect to the blow mold. This tendency of the blank to be rotated by the opening of the neck ring molds is substantially increased in the present construction by reason of the projections 22 on the neck ring molds. These projections adhere to the glass and tend to rotate the blank since the projection on one half of the neck ring mold may adhere less or disengage the blank sooner than the other half, thereby tending to give a rotational movement to the blank. With the present construction and method, the projections 27 on the blank fit into the grooves 30 of the blow mold to prevent rotation of the blank with respect to the blow mold and to prevent checks in glass around the recesses 23 by reason of the blank rotating at the time the ring molds are opened. The projections 27 on the blank are preferably rounded or tapered outwardly to facilitate their entry into the grooves 30 of the blow mold.

The blow mold holders 29 are preferably hinged to a pin or bolt 33 carried by the spaced arms 34 of the bracket 35 which in turn is movably mounted on the blow mold table 11. The holders 29 have connected thereto the spring pressed rods 29', which are connected to suitable means, not shown, for causing the holder to be opened and closed, at predetermined intervals. An adjustable arm 36 has at one end a dove-tail groove that receives the rib 38 on the depending portion 39 of the bracket 35. The arm 36 has at its opposite end a plate 40 which constitutes a bottom for the blow mold 9, and supports the body 41 of the container when the latter is being formed from the blank 28. It is, of course, understood that the shape of the blow mold and the plate 36 may be such as to give any desired configuration to the body of the container.

The container 41, such as a bottle, jar or the like, when it leaves the forming machine is in its complete and final shape such as shown in Figure 4 of the drawings. The cap remover or opener 42 may then be connected to the neck 25 through the openings 23 so as to assume the position as shown in Figure 7. The cap 43 is then applied to the neck and a label 44 is pasted or otherwise attached to the body so as to cover the depression 32 and the handle portion 45 of the opener 42. Preferably a labeling machine of the type embodied in my co-pending application Serial No. 648,013, filed December 19, 1932, is used to insure the label being properly applied.

It will be seen that when the parts are in the position as shown in Figure 7, it will be necessary, in order to move the cap opener to its operative position, to mutilate or tear the label 44 so that should an attempt be made to remove the cap or tamper with the contents of the container after the label has been applied, it will be immediately detected.

As the engagement of the lugs 27 with the recesses 30 in the blank mold insures the depression 32 being formed at all times in proper positional relationship relative to the recesses 23 in the neck, the handle portion 45 of the opener will fit within the depression 32 so that the label 44 may extend over the depression 32 without being wrinkled or otherwise marring the attractive appearance of the container. The depression or off-set portion 32 is of such a depth as to accommodate the handle of the opener without causing the adjacent portion of the label when applied to the container to bulge therefrom.

It will be apparent that if positive means were not employed for insuring the proper positioning of the parts, that the depression 32 might be formed in an off-set position relative to the openings 23 due to the distortion or rotation of the blank body when being transferred from the blank mold to the blow mold, thus preventing the handle portion 45 of the cap remover from properly fitting within the depression 32 when it is connected to the neck and moved to its inoperative position as shown in Figure 7. Consequently, by reason of my improved method of making a glass container of the type having a neck and body, means are provided for insuring the formation of the depression 32 in the body so that it will at all times be capable of receiving the handle portion of the opener and will allow a label to be smoothly applied or attached to the body.

It is to be understood that the form of the invention herewith shown and described is merely illustrative of a preferred embodiment and that such changes may be made in carrying out my invention and in the method of making the glass container as fall within the purview of one skilled in the art without departing from the invention and the scope of the appended claims.

I claim:

1. The method of making a glass container of the type having a neck and body, the body having a portion arranged in predetermined relation to a portion of the neck, which consists in first forming the neck of the container with the body blank attached thereto, and forming a lug on the body blank for insuring a predetermined angular position of the body blank in the blow mold, opening the neck ring mold after the transfer of the body blank, and then forming the body after the opening of the neck ring mold.

2. The method of making a glass container of the type having a neck and a body, the latter having a portion arranged in predetermined relationship to a portion of the neck, which consists in first forming the neck of the container with the body blank attached thereto and forming a lug on the body blank, utilizing the said lug as a means for insuring a predetermined angular position of the body and neck in a blow mold, removing the neck ring mold from the blank after the transfer of the body blank to a blow mold, and then forming the body after the removal of the neck ring mold.

3. The method of making a glass container of the type having a neck and a body, the latter having a portion arranged in predetermined relationship to a portion of the neck, which consists in first forming the neck of the container with the body blank attached thereto and forming a lug on the body blank at the juncture of the neck and body blank, utilizing the said lug as a means for preventing rotation of the blank in the blow mold and for insuring a predetermined angular position of the body and neck in a blow mold, opening the neck mold when the body blank is in the blow mold and then forming the body after the removal of the neck mold.

4. The method of making a glass container having a neck and body which consists in first forming the neck and diametrically opposed lugs on the outer surface of the body blank, removing the neck mold from the body blank while the latter is in a blow mold and thereafter forming the body in the blow mold with a depression medially between and below the lugs.

5. The method of making a glass container having a neck and body which consists in forming the finished neck with spaced recesses for a cap remover, forming a lug on the outer surface of the body blank at the juncture of the neck and body for positioning the body blank in a blow mold, removing the neck molds from the body blank after the latter is in a blow mold, and thereafter forming the body of the container and in the formation of the body providing a depression therein at a point medially between and below said recesses.

6. A machine for forming glass containers of the type having a neck and a body, comprising a neck ring, a blank mold and a blow mold, said blank mold having means for forming lugs on the body blank, said blow mold having means for receiving said lugs whereby to insure predetermined fixed angular relationship between a predetermined portion of the neck and a predetermined portion of the blow mold, and means for opening said neck ring after transfer of the body blank to the blow mold and prior to blowing the body blank in the blow mold.

7. A machine for forming glass containers of the type having a neck and a body, comprising a neck ring, a blank mold and a blow mold, said blank mold having means for forming lugs at diametrically opposite points on the blank, and said blow mold having means for receiving said lugs whereby to insure predetermined fixed positional relationship between a predetermined portion of the neck of the blank and a predetermined portion of the blow mold, said blow mold having means for forming a depression in the container body at said predetermined portion of the blow mold, and means for removing said neck ring from the blank after transfer to the blow mold and prior to the blowing operation.

8. A machine for forming glass containers of the type having a neck and a body, comprising a neck ring having means for forming a pair of recesses in the neck for receiving a cap remover, means for opening the neck ring, a blank mold having means for forming in the body blank a pair of lugs spaced equidistantly from and at opposite sides of the parting line of the neck ring and a blow mold having recesses for receiving said lugs to retain the body blank in proper position during and after the opening of the neck ring and prior to the blowing operation, and means on the blow mold for forming a depression in the container body below and in predetermined relation to said recesses in the neck, said blow mold recesses serving to position said neck and body blank whereby to insure a predetermined relationship of the neck recesses to said depression forming means in the blow mold.

9. In a machine for forming glass containers having a neck and body, a neck ring, means for opening said neck ring, a blank mold, a blow mold, said neck ring having means for forming cap remover recesses in the neck of the container, said blank mold having means for forming opposed lugs on the body blank, and means on the blow mold for forming a depression in the wall of the body, said blow mold having recesses for receiving said lugs when the blank is transferred to the blow mold to hold said blank in proper position during and after the opening of said neck ring and prior to the blowing operation whereby to insure the depression being formed below and medially of the recesses in said neck.

10. The method of making a glass container having a neck provided with recesses for retaining a cap remover and a body having a depression arranged in predetermined relation to said recesses, which comprises first forming the neck with the body blank and forming on the body blank anchor means for insuring a predetermined angular position of the body during a subsequent body blowing operation, removing the neck mold from the body blank, thereafter subjecting the body blank to a blowing operation to form the body, said depression having a predetermined position with relation to said recesses, while utilizing the anchor means to insure the desired angular position of the body and neck of the blank with respect to the blow mold after removal of the neck mold from the blank and during the blowing operation.

11. The method of making a glass container having a neck provided with retaining recesses for a cap remover and a body having a depression arranged in predetermined relation to said recesses to receive a portion of said cap remover, which method comprises first forming the neck with the body blank and forming on the body blank anchor means at the juncture of the neck and body blank for insuring a predetermined position of the body during the subsequent body blowing operation, removing the neck forming means from the body blank, and thereafter subjecting the body blank to a blowing operation to form the body with the depressed portion having a predetermined position with relation to said recesses, while utilizing the anchor means to insure a predetermined angular position of the body and neck in the blow mold during the opening of the neck ring molds and during the blowing operation.

12. The method of making a glass container having a neck and body which consists in first forming the neck and diametrically opposed lugs on the outer surface of the body blank at the juncture of the neck and body, transferring the body blank to a forming means, removing the neck mold from the blank, thereafter forming the body with a depression madially between and below the lugs, and utilizing the lugs to insure the proper angular position of the depression with respect to the neck.

13. The method of making a glass container having a neck and body, which consists in forming the finished neck with spaced recesses for a cap remover, forming a lug on the outer surface of the body blank, transferring the blank to a body forming means, removing the neck mold from the blank, thereafter forming the body of the container and in the formation of the body providing a depression therein at a point medially between and below said recesses, and utilizing said lug to insure the position of the depression being medially of said recesses.

14. A machine for forming glass containers of the type having a neck and a body, comprising a neck ring, means for opening the neck ring, a blank mold and a blow mold, said blank mold having means for forming a lug at a point on the blank, and said blow mold having means for receiving said lug whereby to insure predetermined fixed angular relationship between a predetermined portion of the neck and a predetermined portion of the blow mold after the opening of the neck ring and prior to the blowing operation.

15. A machine for forming glass containers of the type having a neck and a body, comprising a neck ring having means for forming a pair of recesses in the neck for receiving a cap remover, means for opening said neck ring for releasing the body blank, a blank mold having means for forming in the body blank a lug, a blow mold having a recess for receiving said lug, and means for forming a depression in the container body below and in predetermined relation to said recesses in the neck, said blow mold recesses serving to position said neck and body blank in the blow mold and to prevent relative rotation therebetween, after opening of the neck ring and prior to the operation of said forming means, whereby to insure a predetermined fixed relationship of the neck recesses to said depression forming means.

16. In a machine for forming glass containers having a neck and body, a neck ring, means for opening said neck ring, a blank mold, a blow mold, said blow mold having a recess for forming a lug at the juncture of the neck and body, means for moving the neck ring to transfer the blank from the blank mold upon the formation of the neck and lug to the blow mold to form the body of the container, said blow mold provided with a notch for receiving said lugs whereby to prevent relative rotation and to insure a predetermined angular relationship between the blank and the blow mold during the opening of the neck ring and subsequent blowing operation.

17. A glassware forming machine having in combination, a neck ring, a blank mold, and a blow mold for forming the neck and body of the container, said blank mold having interlocking means formed at the juncture of the neck and body, means transferring the neck ring and the container blank from the blank mold to the blow mold upon the formation of the neck and lugs, means for opening the neck ring to release the container blank, said blow mold having means for locking with said interlocking means, and means on said blow mold for forming a depression in the body, said locking and interlocking means being adapted to prevent relative rotation between the container blank and the blow mold after the opening of the neck ring and prior to the blowing operation to insure the depression being formed below and medially of the recesses in the neck.

18. The method of making a glass container having a neck provided with recesses for a cap remover and a body having a depression positioned below and medially of said recesses, which method comprises forming a blank with a neck and a body portion and simultaneously forming an interlocking means on the body of the blank adjacent the neck, utilizing said interlocking means to prevent rotation of the blank about its axis during the release of the blank by the transferring means and during the subsequent blowing operation, thereby to maintain the depression medially of said recesses, and then subjecting the blank to a blowing operation to form the body with said depressed portion.

19. The method of making a glass container having a neck and body, the neck portion having recesses adapted to receive a cap remover, which method comprises forming the neck with said recesses therein and simultaneously forming means on the body for locking with a mold, transferring the blank to a blow mold, opening the neck ring to release the blank prior to the blowing operation, utilizing said locking means to lock the blank against rotation in a mold during the blowing operation to insure proper formation of the recesses, and then blowing the blank into its finished form.

20. A machine for forming glass containers of the type having a neck and a body and having recesses in the neck adapted to receive a cap remover, comprising, in combination, a neck ring having means for forming a pair of recesses in the neck for receiving a cap remover, a blank mold having means for forming an interlocking means in the blank adapted to engage with cooperating means on the blow mold to prevent relative rotation between the blow mold and the blank after release of the blank by the neck ring, means for opening the neck ring to release the blank, and a blow mold having means adapted to lock with said interlocking means on the blank.

21. In a machine for forming glass containers having a neck and body, a neck ring, means for opening the neck ring, a blank mold, a blow mold, said neck ring having means for forming recesses in the neck of the container, said blank mold having means for forming an interlocking means on the body blank, and means on the blow mold for forming a depression in the wall of the body, said blow mold having interlocking means to lock with the interlocking means on the blank when the blank is transferred to the blow mold to prevent angular movement of the blank with respect thereto after the neck ring releases the blank, whereby to insure the depression being formed below and medially of the recesses in said neck.

FRANK L. DARLING.